US 6,550,775 B2

(12) United States Patent
Knapp

(10) Patent No.: US 6,550,775 B2
(45) Date of Patent: Apr. 22, 2003

(54) ANNULAR GASKET

(75) Inventor: Mark Knapp, Ravenna, OH (US)

(73) Assignee: Malcolm Mann, Inc., Chagrin Falls, OH (US)

( * ) Notice: Subject to any disclaimer, the term of this patent is extended or adjusted under 35 U.S.C. 154(b) by 0 days.

(21) Appl. No.: 09/998,697

(22) Filed: Nov. 30, 2001

(65) Prior Publication Data

US 2002/0074741 A1 Jun. 20, 2002

Related U.S. Application Data

(63) Continuation-in-part of application No. 09/726,814, filed on Nov. 30, 2000, now Pat. No. 6,367,802.

(51) Int. Cl.[7] .......................... F16L 21/02; F16L 17/06; F16L 17/025
(52) U.S. Cl. ................. 277/314; 277/608; 277/609; 277/616; 277/626; 277/627; 285/903; 285/379
(58) Field of Search .................. 277/314, 608, 277/609, 616, 619, 624, 625, 626, 627; 285/903, 104, 340, 379

(56) References Cited

U.S. PATENT DOCUMENTS

| | | |
|---|---|---|
| 2,230,725 A | 2/1941 | Nathan |
| 2,259,940 A | 10/1941 | Nathan |
| 3,031,200 A | 4/1962 | Hamer |
| 3,118,682 A | 1/1964 | Fredd |
| 3,380,763 A | 4/1968 | Schmunk |
| 3,386,745 A | 6/1968 | Hein |
| 3,445,120 A | 5/1969 | Barr |
| 3,469,854 A * | 9/1969 | Linwood |
| 3,695,639 A | 10/1972 | Shire et al. |
| 3,796,447 A | 3/1974 | de Putter |
| 3,813,107 A | 5/1974 | Ditcher |
| 3,856,315 A | 12/1974 | Stansbury |
| 3,865,386 A | 2/1975 | Wilke |
| 3,955,834 A | 5/1976 | Ahlrot |
| 4,018,461 A | 4/1977 | Bram |
| 4,097,074 A | 6/1978 | Nagao et al. |
| 4,188,040 A | 2/1980 | Wolf et al. |
| 4,223,895 A | 9/1980 | Roberts, Jr. et al. |
| 4,298,206 A | 11/1981 | Kojima |
| 4,333,662 A | 6/1982 | Jones |
| 4,387,900 A | 6/1983 | Ditcher et al. |
| 4,394,024 A | 7/1983 | Delhaes |
| 4,487,421 A | 12/1984 | Housas et al. |
| 4,566,704 A | 1/1986 | Van Dongeren |
| 4,575,128 A | 3/1986 | Sundquist |
| 4,585,026 A | 4/1986 | Norton |
| 4,602,792 A | 7/1986 | Andrick |
| 4,602,793 A | 7/1986 | Andrick |
| 4,630,848 A | 12/1986 | Twist et al. |
| 4,641,858 A | 2/1987 | Roux |

(List continued on next page.)

FOREIGN PATENT DOCUMENTS

JP  411218280 A  *  8/1999

*Primary Examiner*—Anthony Knight
*Assistant Examiner*—Vishal Patel
(74) *Attorney, Agent, or Firm*—Watts, Hoffmann, Fisher & Heinke Co., L.P.A.

(57) ABSTRACT

An annular gasket for providing a fluid-tight seal between a corrugated pipe and a smooth annular section of a second member. The gasket includes a support portion and a gasket portion. The support portion is made from a first material having a first hardness. The support portion includes an anchor portion shaped to fit within a recess or groove in a first member and a tip portion that extends radially outward from the anchor portion. The gasket portion is made from a softer elastomeric material. The gasket portion is disposed on the tip portion. The gasket portion is configured to make sealing contact with a ridge of the first pipe and the smooth annular section when the first pipe and the smooth annular section are in a relative surrounded and surrounding relationship.

14 Claims, 3 Drawing Sheets

U.S. PATENT DOCUMENTS

| | | |
|---|---|---|
| 4,702,502 A | 10/1987 | Shade et al. |
| 4,711,474 A | 12/1987 | Patrick |
| 4,772,154 A | 9/1988 | Caroulle |
| 4,818,209 A | 4/1989 | Petersson et al. |
| 4,826,028 A | 5/1989 | Vassallo et al. |
| 4,834,398 A | 5/1989 | Guzowski et al. |
| 5,058,907 A | 10/1991 | Percebois et al. |
| 5,064,207 A | 11/1991 | Bengtsson |
| 5,067,751 A | 11/1991 | Walworth et al. |
| 5,106,129 A | 4/1992 | Camacho et al. |
| 5,114,162 A | 5/1992 | Ditcher |
| 5,143,381 A | 9/1992 | Temple |
| 5,169,161 A * | 12/1992 | Jones .................. 277/615 |
| 5,180,196 A | 1/1993 | Skinner |
| 5,288,087 A | 2/1994 | Bertoldo |
| 5,324,083 A | 6/1994 | Vogelsang |
| 5,326,138 A * | 7/1994 | Claes et al. |
| 5,407,236 A | 4/1995 | Schwarz et al. |
| 5,415,436 A | 5/1995 | Claes et al. |
| 5,542,717 A | 8/1996 | Rea et al. |
| 5,573,279 A | 11/1996 | Rea et al. |
| 5,603,532 A | 2/1997 | Guest |
| 5,687,976 A | 11/1997 | Andrick et al. |
| 5,813,705 A | 9/1998 | Dole |
| 5,988,695 A | 11/1999 | Corbett, Jr. |
| 5,992,469 A | 11/1999 | Hegler |
| 5,996,635 A | 12/1999 | Hegler |
| 6,082,741 A | 7/2000 | Gregoire et al. |
| 6,126,173 A | 10/2000 | Westhoff et al. |
| 6,126,209 A | 10/2000 | Goddard |
| 6,170,883 B1 | 1/2001 | Mattsson et al. |
| 6,193,285 B1 | 2/2001 | Proctor |
| 6,237,966 B1 | 5/2001 | Kearns |
| 6,343,623 B2 * | 2/2002 | Hegler |

* cited by examiner

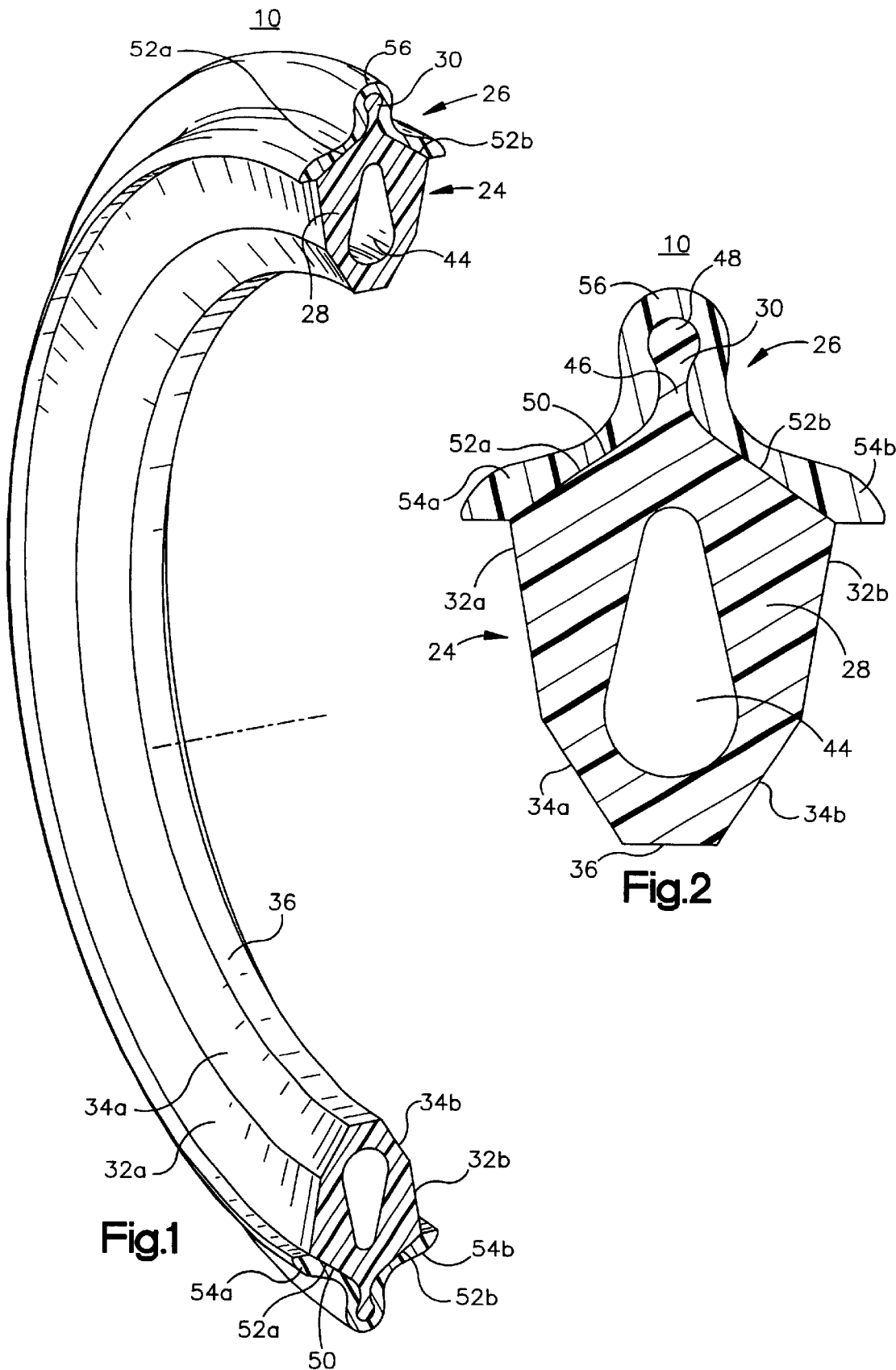

ANNULAR GASKET

RELATE BACK

This application is a continuation-in-part of U.S. patent application Ser. No. 09/726,814, filed Nov. 30, 2000 entitled "HDPE Pipe Locking Ring With Gasket," now U.S. Pat. No. 6,367,802, which is incorporated by reference in its entirety.

TECHNICAL FIELD

The present invention relates to elastomeric gaskets and, more specifically, to a co-extruded gasket for providing a seal between a pair of tubular members that includes an elastomeric gasket portion and a support portion that presses the elastomeric portion into engagement with the tubular members.

BACKGROUND ART

It is well known to form a seal between two pipe sections, such as two corrugated pipe sections, where the end of one of the pipe sections has annular grooves and one of the pipe sections has an enlarged bell portion at one end. Some prior art elastomeric gaskets are placed around the end of the pipe section having annular grooves. The pipe section having annular grooves is inserted into an enlarged bell portion of a second pipe section. The elastomeric gasket contacts each of the pipe sections to form a seal between the pipe sections.

Some prior art gaskets are adapted to fit in the groove of a corrugated pipe or pipe connector. As one end of a pipe is pushed into the enlarged end or bell of another pipe section or pipe connector, the gasket is sometimes pulled from the groove and the pipe is not properly sealed. When the pipe is not properly sealed ground water may leak into the pipe or fluid may leak out of the pipe and contaminate the ground.

U.S. Pat. No. 4,702,502 attempted to solve the problem of the gasket being pulled from the annular grooves of a corrugated pipe when the corrugated pipe was inserted into a bell portion of a second corrugated pipe. The '502 patent concerns a telescopic joint in low pressure corrugated plastic pipes. The joint includes a one piece elastomeric gasket that has a sealing portion adapted to be disposed in a groove in one of the pipes and an anchoring portion adapted to be disposed in an adjacent groove. As the pipes are telescoped together the anchoring portion is trapped in the groove and anchors the sealing portion in place as it is compressed.

U.S. Pat. No. 3,796,447 to de Putter concerns a corrugated pipe connector for connecting ends of two male pipes. A rubber sealing ring is maintained in a corrugation of the pipe connector by a maintaining ring. The maintaining ring avoids removal of the sealing ring from the corrugation of the pipe connector during insertion of the male pipe ends into the corrugated pipe connector.

U.S. Pat. No. 4,834,398 to Guzowski et al. concerns a pipe sealing gasket having a first portion formed out of a hard, relatively high durometer material and a second portion formed of a relatively lower durometer, more flexible material. The harder first portion of the gasket is contacted first as the pipes are assembled, causing the gasket to maintain its position during assembly.

Typically, corrugated pipes do not hold a very tight tolerances. If a gasket rolls or folds over as the first and second pipe sections are assembled, a fluid tight seal may not result or the corrugated pipe could be damaged. A gasket is needed that includes a support portion that prevents the gasket from rolling or folding over and maintains the gasket in tight contact with the corrugated pipe and the bell.

SUMMARY OF THE INVENTION

The present invention is directed to a reinforced annular gasket for providing a fluid tight seal between a corrugated pipe and a smooth annular section of a second member, when the corrugated pipe and the smooth annular section are in a relative surrounded and surrounding relationship. The annular gasket includes a support portion and an elastomeric gasket portion. The support portion is made from a first material having a first durometer. The support portion includes an anchor portion shaped to fit within a recess formed in a ridge of a corrugated pipe or with a groove of a corrugated pipe and a tip portion that extends radially outward from the anchor portion. The support portion is configured such that when the anchor portion is disposed in a recess in a ridge of a corrugated pipe, the tip portion extends radially outward of the ridge. The elastomeric gasket portion is made from a second material having a durometer that is less than the durometer of the support portion. The elastomeric gasket portion is disposed on the support portion. The gasket portion may be configured in any shape that creates a seal. The gasket portion is configured to make sealing contact with the ridge of the corrugated pipe and the smooth annular section when the corrugated pipe having a recess in which the gasket is received and the smooth annular section are in a relative surrounded and surrounding relationship.

In disclosed embodiments of the invention, the gasket portion includes first and second leg portions that extend laterally of first and second sides of the support portion to contact the ridge of the corrugated pipe when the gasket is installed in the recess in the ridge of the corrugated pipe. The support portion and the elastomeric gasket are coextruded or glued together. In one embodiment, the tip of the support portion includes a transition portion or neck portion having a reduced thickness. The thickness of the transition portion may be varied to increase or decrease the force required to bend or deform the transition portion. An opening may be included in the support portion to reduce the amount of material required to construct the support portion.

A fluid tight coupling that utilizes the disclosed gasket includes a corrugated pipe, an outer annular section, and an annular gasket. Corrugated pipe has an annular groove and an adjacent ridge that includes a recess. The annular section has a smooth inner surface disposed around the corrugated pipe. The annular gasket is disposed between the corrugated pipe and the annular section. The annular gasket includes a support portion made from a first material having a first durometer. The support portion includes an anchor portion disposed within the recess and a tip portion extending radially outward from the anchor portion. The tip portion extends radially outward of the ridge of the corrugated pipe. An elastomeric gasket portion made from a second material having a durometer that is less than the durometer of the support portion is disposed on the tip portion of the support portion. The elastomeric gasket portion makes sealing contact with the ridge of the corrugated pipe and the smooth annular section.

The disclosed gasket is used in a method of providing a fluid tight seal between a ridge of a corrugated pipe and a smooth inner surface of an annular section. In the method, a support portion of the gasket is inserted into a recess in a ridge of a corrugated pipe such that a tip of the support portion extends radially outward of the ridge. The ridge of the corrugated pipe is engaged with an elastomeric gasket portion of the gasket that is disposed on the support portion. The corrugated pipe is inserted into a smooth annular section having a smooth inner surface. The elastomeric gasket portion engages the ridge of the corrugated pipe and the smooth annular section to provide a fluid tight seal between the corrugated pipe and the smooth annular section.

Additional features of the invention will become apparent and a fuller understanding will be obtained from the following detailed description in connection with the accompanying drawings.

BRIEF DESCRIPTION OF THE DRAWINGS

FIG. 1 is a perspective view of a portion of the annular gasket of one embodiment of the present invention;

FIG. 2 is a cross section of the elastomeric gasket of one embodiment of the present invention;

DETAILED DESCRIPTION OF THE PREFERRED EMBODIMENTS

Figure 4:
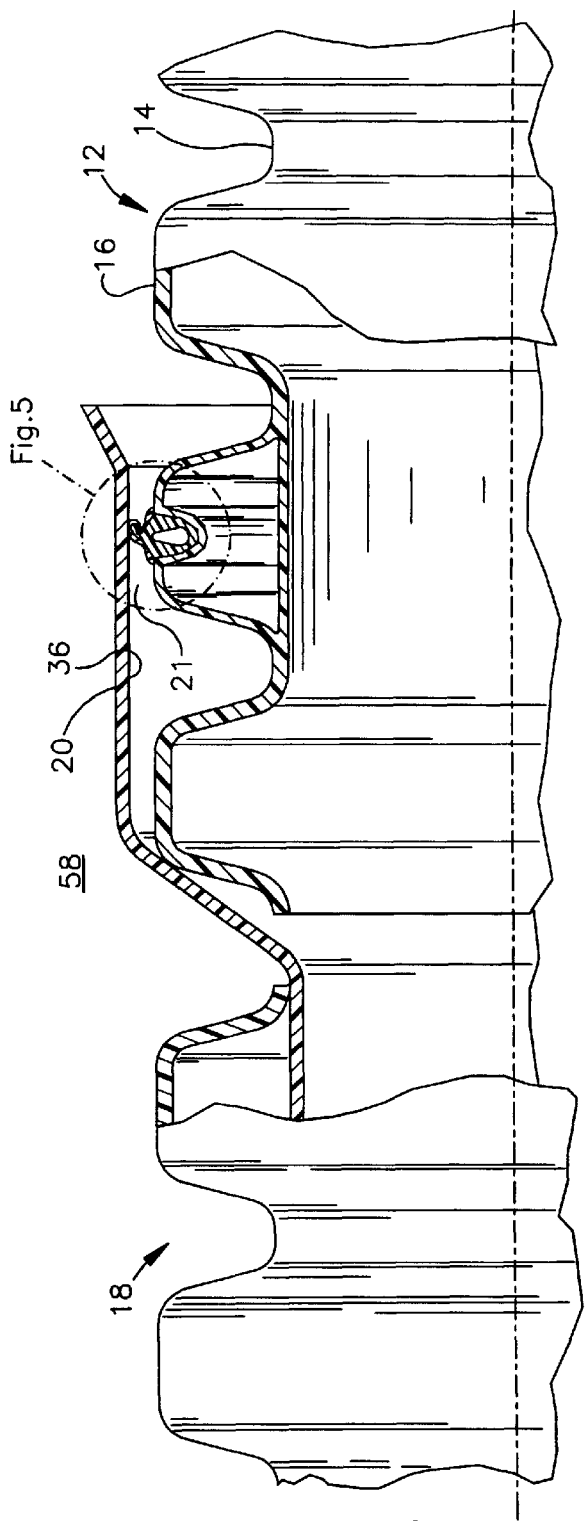
FIG. 4 is a sectional view of a gasket of the present invention installed on a corrugated pipe, and engaged by an enlarged end of a second pipe.
Figure 6:
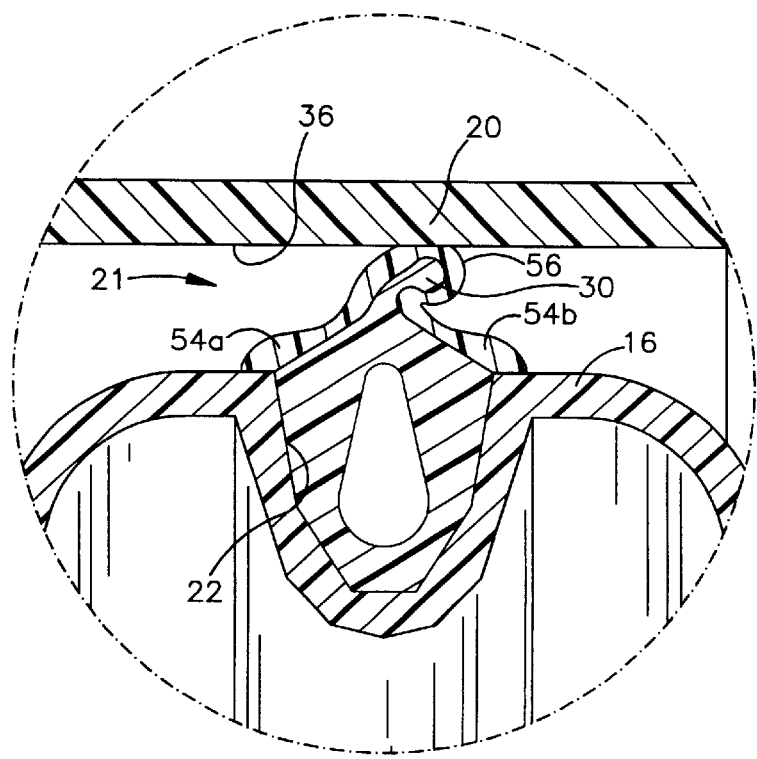
FIG. 6 is an enlarged fragmented view of FIG. 4.

Referring to the drawings, the present invention is directed to a resilient annular gasket 10 for providing a fluid tight seal between a first tubular member 12 that has a plurality of annular grooves 14 and ridges 16 and second tubular member 18 that includes a smooth annular section 20, such as a bell. Referring to FIGS. 4 and 6, the annular gasket 10 seals a gap 21 between the first tubular member 12 and the smooth annular section 20 of the second member 18 when the first tubular member and the smooth section are in a relative surrounded and surrounding relationship. In the illustrated embodiment, the second tubular member 18 is a corrugated pipe having an integral bell or large end that is not corrugated. In an alternate embodiment, the integral bell or large end includes corrugations that strengthen the integral bell or large end. In the illustrated embodiment, the first tubular member 12 is a corrugated pipe that includes a recess 22 in one of the ridges 16.

Figure 5:
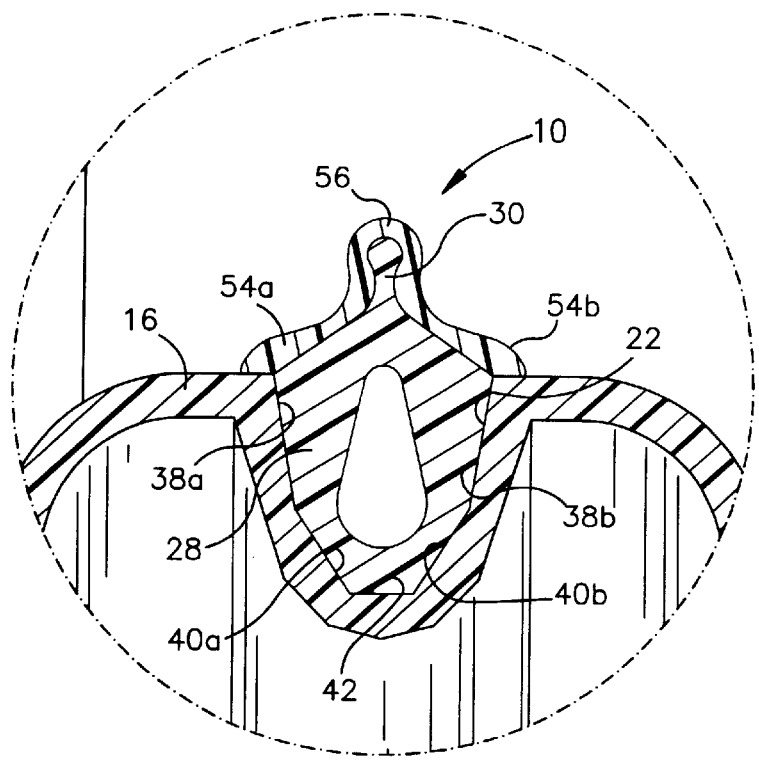
FIG. 5 is an enlarged fragmented view of FIG. 3.

Referring to FIGS. 1 and 2, the annular gasket 10 includes a support portion 24 and an elastomeric gasket portion 26. The support portion 24 is made from a material having a first, relatively hard, durometer. In the illustrated embodiment, the support portion 24 includes an anchor portion 28 shaped to fit within the recess 22 in a ridge 16 of the corrugated pipe and a tip portion 30 that extends radially outward from the anchor portion 28. In an alternate embodiment, (not illustrated) the anchor portion 28 is shaped to fit within a groove 14 in the corrugated pipe. Referring to FIG. 5, the tip portion 30 is radially outward of the ridge 16 when the anchor portion 28 is disposed in the recess 22 in the ridge 16 or a groove 14 in the corrugated pipe.

The anchor portion 28 is shaped to fit within the recess 22 in a ridge 16 in the corrugated pipe. The shape of the anchor portion 28 can be changed to fit within recesses having different shapes or to fit within a groove 14 in the corrugated pipe. Referring to FIGS. 1 and 2, the illustrated support portion 28 includes first and second side surfaces 32a, 32b, first and second intermediate surfaces 34a, 34b, and an inner surface 36.

Referring to FIG. 5, the first and second side surfaces 32a, 32b correspond to first and second side walls 38a, 38b of the recess 22. The intermediate surfaces 34a, 34b correspond to intermediate walls 40a, 40b. The inner surfaces 36 corresponds to a bottom wall 42 of the recess 22. The anchor portion 28 includes an outer surface 50 formed by first and second radially outer lateral surfaces 52a, 52b.

Referring to FIGS. 1 and 2, the anchor portion 28 includes an opening 44. The opening 44 reduces the amount of material needed to form the anchor portion 28. In the illustrated embodiment, the opening 44 has a tear drop shape. It should be readily apparent to those skilled in the art that any shape of opening could be used.

Referring to FIGS. 1 and 2, the illustrated tip portion 30 includes a transition portion 46 or neck portion and an end portion 48 that is rounded in the illustrated embodiment. The transition portion 46 is an area of reduced thickness that extends from the outer surface 50 of the anchor portion 28 in the illustrated embodiment. It should be readily apparent to those skilled in the art that the thickness of the transition portion 46 can be varied to increase or decrease an amount of force required to deflect the end portion 48. The end portion 48 extends radially outward from the neck portion 46. It should also be readily apparent to those skilled in the art that the end portion can be any shape that holds a gasket portion in contact with the second tubular member.

In the exemplary embodiment, a harder SEBS material is used to construct the support portion 24. Use of a harder material for constructing the support portion 24 increases the force required to fold the tip portion 30 over. The result is that a tighter seal is provided against the smooth annular section 20 and the ridge 16. The SEBS material reinforces the pipe corrugation, reducing the amount deflection when pressure is applied. It should be readily apparent that other filler material can be used to construct the support portion 24 of the gasket 10. The SEBS material could be replaced with any type of harder material. SEBS material is relatively inexpensive and has good elasticity.

The elastomeric gasket portion 26 is made from a second material having a durometer that is less than the durometer of the support portion 24. Referring to FIGS. 1 and 2, the gasket portion 26 is disposed on the tip portion 30 and the outer surface 50 of the support portion 24. The gasket portion 26 is configured to make sealing contact with a ridge 16 and the smooth annular section 20 when a corrugated pipe having a recess 22 in which the gasket 10 is received and the smooth annular section 20 of the second tubular member 18 are in a relative surrounding relationship (see FIGS. 4 and 6).

The elastomeric gasket portion 26 includes first and second leg portions 54a, 54b connected by a central portion 56. The central portion 56 covers the tip portion 30 of the support portion 24. The central portion 56 can be configured in any shape that makes contact with the smooth annular section 20. The first and second leg portions 54a, 54b cover the radially outer surfaces 52a, 52b of the anchor portion 28 and extend laterally of the first and second side surfaces 32a, 32b of the anchor portion 28. In the exemplary embodiment, the gasket portion 26 and the support portion 24 are coextruded. In another embodiment, the support portion and the gasket portion are bonded together by some means other than co-extrusion. The gasket may be attached to the locking member by adhesives or any other acceptable attachment method.

A variety of natural or synthetic rubbers, such as Isoprene or Ethylene Propylene Diene Monomer (EPDM) could be used as the gasket portion material. The preferred durometer range of the gasket 10 material is 40–60. In the exemplary embodiments, the gaskets 10 are made from 50 duro thermoplastic per ASTM F-477-LH.

The gasket 10 can be made by extruding a length of gasket material and connecting its ends together by gluing or vulcanization. For example, an annular gasket for an 18 inch pipe would be formed of a 57.5 inch of gasket material. An annular gasket 20 for a 24 inch pipe would be formed from a 76.0 inch length of gasket material. The annular gasket 20 can also be molded to eliminate the step of connecting the gasket ends.

Figure 3:
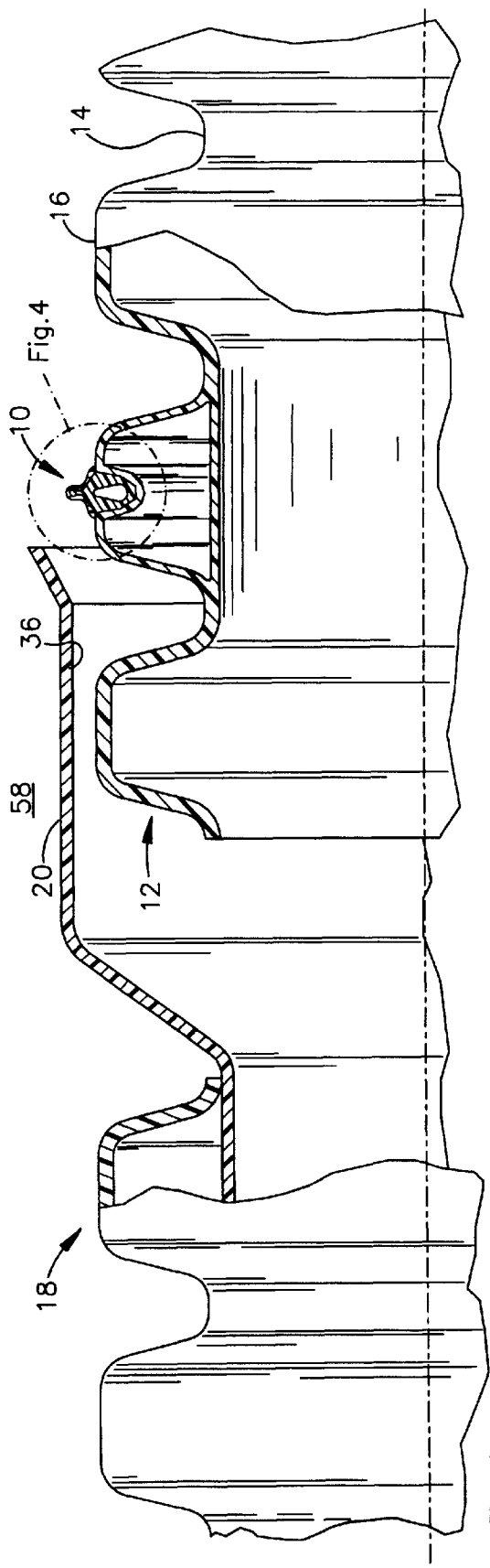
FIG. 3 is a sectional view of a gasket of the present invention installed on a corrugated pipe.

FIGS. 3, and 4 illustrate a coupling 58 formed with the disclosed gasket 10. Although the gasket 10 could be used to form a joint between metal, concrete and other tubular sections, it is particularly well suited for use with corrugated plastic pipe. The illustrated coupling 58 includes a corrugated pipe 12, an outer annular section 20 (a bell portion of a second corrugated pipe in the illustrated embodiment) and an annular gasket 10. The corrugated pipe 12 has annular grooves 14 in ridges 16. In the illustrated embodiment, one of the ridges 16 includes a recess 22 that receives an anchor portion 28 of the gasket 10. In an alternate embodiment, the anchor portion 28 is sized to fit within one of the grooves 14 in the corrugated pipe. The annular section 20 is disposed around the corrugated pipe 12. The annular gasket 10 is disposed between the corrugated pipe 12 and the annular section 20. The anchor portion 28 of the annular gasket 10 is disposed within the recess 22. The tip portion 30 of the support portion 24 extends radially outward of the ridge 16. Referring to FIG. 6, the first and second leg portions 54a, 54b are disposed on a ridge 16 and make sealing contact with a ridge 16. The central portion 56 of the gasket portion 26 makes sealing contact with the smooth annular section 20.

Referring to FIG. 6, the smooth annular section 20 or enlarged bell portion applies pressure to the central portion 56 of the gasket portion 10 and deforms the central portion 56. The tip portion 30 is harder than the gasket material, increasing the force required to fold over or bend the central portion 56 of the gasket 10. The increase in force required to deform the central portion 56 results in a tighter seal between the central portion 56 and the bell of the second tubular member and a tighter seal between the leg portions 54a, 54b and the ridge 16.

In addition, since the material of the anchor portion 28 is harder than the gasket portion 26 material, the anchor portion 28 material reinforces the pipe corrugation, reducing the amount of deflection of the pipe corrugation when pressure is applied.

Referring to FIGS. 3, 4, 5 and 6, the disclosed gasket 10 is used in a method of providing a fluid tight seal between a corrugated pipe having a ridge 16 that includes a recess 22 and a smooth inner surface 36 of an annular section 20 or bell portion. The support portion 24 of the gasket 10 is inserted into the recess 22 of a corrugated pipe. The tip portion 30 of the support portion 24 extends radially outward of the ridge 16. The ridge 16 is engaged with the leg portions 54a, 54b that are disposed on the radially outer surfaces 52a, 52b of the support portion 24. The corrugated pipe is inserted into a smooth annular section 20, such as the depicted bell portion of a corrugated pipe having a smooth inner surface 60. The smooth annular section 20, or bell portion, is engaged with the central portion 56 of the elastomeric gasket portion 26. The central portion 56 of the elastomeric gasket portion 26 and the tip portion 30 of the support portion 24 are deformed by the smooth annular section 20, or bell. The harder tip portion 30 resists deformation and presses the central portion 56 and gasket portion 26 tightly against the bell, thereby creating a tight seal between the central portion 56 in the bell. The increase in force required to deform the tip portion 30 presses leg portions tightly against the ridge 16.

It will be understood that various modifications can be made without departing from the spirit and scope of the invention.

I claim:

1. An annular gasket for providing a fluid-tight seal between a corrugated pipe having an annular groove and an adjacent ridge that includes a recess, and a smooth annular section of a second member, when the corrugated pipe and the section are in a relative surrounded and surrounding relationship, comprising:

a) a support portion made from a first material having a first durometer that includes an anchor portion shaped to fit within at least one of said recess in said ridge and said annular groove and a tip portion extending radially outward from said anchor portion, said tip portion is radially outward of said ridge, said first material of said anchor portion directly contacting said corrugated pipe in said at least one of said recess and said annular groove when said annular gasket is installed on said corrugated pipe; and b) an elastomeric gasket portion made from a second material having a second durometer that is less than said first durometer disposed on said tip portion of said support portion, said gasket portion being configured to make sealing contact with said ridge and said smooth annular section when said annular gasket is installed on said corrugated pipe and said corrugated pipe and the smooth annular section are in a relative surrounded and surrounding relationship.

2. The annular gasket of claim 1 wherein said gasket portion includes first and second leg portions that extend laterally of first and second sides of said support portion to contact a radially outer surface of at least one ridge.

3. The annular gasket of claim 1 wherein said support portion and said elastomeric gasket portion are co-extruded.

4. The annular gasket of claim 1 wherein said tip includes a neck portion having a reduced thickness.

5. The annular gasket of claim 1 further comprising an opening through said support portion.

6. An annular gasket for providing a fluid-tight seal between a corrugated pipe having an annular groove and an adjacent ridge that includes a recess, and a smooth annular section of a second member, when the corrugated pipe and the section are in a relative surrounded and surrounding relationship, comprising:

a) a support portion made from a first material having a first durometer that includes an anchor portion shaped to fit within and directly contact said recess in said ridge of said corrugated pipe and a tip portion extending radially outward from said anchor portion, such that when said anchor portion is disposed in said recess said tip portion is radially outward of said ridge; and b) an elastomeric gasket portion made from a second material having a second durometer that is less than said first durometer disposed on said tip portion of said support portion, said gasket portion includes first and second leg portions that extend laterally of first and second sides of said support portion connected by a central portion that covers said tip, said first and second legs make sealing contact with a radially outermost surface of said ridge and said central portion making sealing contact with a smooth annular section when said corrugated pipe having said recess in which the gasket is received and the smooth annular section are in a relative surrounded and surrounding relationship.

7. A fluid tight corrugated pipe coupling, comprising:

a) a corrugated pipe having an annular groove and an adjacent ridge that includes a b) an annular section having a smooth inner surface disposed around said corrugated pipe;

c) an annular gasket disposed between said corrugated pipe and said annular section, said annular gasket including a support portion made from a first material having a first durometer that includes an anchor portion disposed within at least one of said recess and said groove such that said first material directly contacts said at least one of said recess and said groove and a tip portion extending radially outward from said anchor portion and radially outward of said ridge, and an elastomeric gasket portion made from a second material having a second durometer that is less than said first durometer disposed on said tip portion and said support portion that makes sealing contact with said ridge and said smooth annular section.

8. The coupling of claim 7 wherein said gasket portion includes first and second leg portions that extend laterally of first and second sides of said support portion to contact such ridge.

9. The coupling of claim 7 wherein said support portion and said elastomeric gasket portion are co-extruded.

10. The coupling of claim 7 wherein said tip includes a neck portion having a reduced thickness.

11. The coupling of claim 7 further comprising an opening through said support portion.

12. A fluid tight corrugated pipe coupling, comprising:

a) a corrugated pipe having an annular groove and an adjacent ridge that includes a recess;

b) an annular section having a smooth inner surface disposed around said corrugated pipe;

c) an annular gasket disposed between said corrugated pipe and said annular section, said annular gasket including a support portion made from a first material having a first durometer that includes an anchor portion disposed within said recess such that said first material directly contacts said recess and a tip portion extending radially outward from said anchor portion and radially outward of said ridge, and an elastomeric gasket portion made from a second material having a second durometer that is less than said first durometer disposed on said tip portion, said gasket portion includes first and second leg portions that extend laterally of first and second sides of said support portion connected by a central portion that covers said tip, said first and second legs make sealing contact with a radially outer surface of said adjacent ridge and said central portion making sealing contact with said smooth inner surface.

13. A method of providing a fluid tight seal between a corrugated pipe having a ridge that includes a recess and a smooth inner surface of an annular section, comprising:

a) inserting a gasket support portion made from a first material having a first durometer into one of said recess in said ridge of said corrugated pipe and a groove adjacent to said ridge such that said first material directly contacts said corrugated pipe and a tip of said support portion extends radially outward of said ridge;

b) engaging said ridge with an elastomeric gasket portion that is disposed on said support portion said gasket portion made from a second material having a second durometer that is less than said first durometer;

c) inserting said corrugated pipe into said smooth annular section having said smooth inner surface; and d) engaging said smooth annular section with said elastomeric gasket portion to provide a fluid tight seal between said corrugated pipe and said smooth annular section.

14. The method of claim 13 wherein said elastomeric gasket portion includes first and second legs that engage a radially outermost surface of said ridge and a central tip portion that engages said smooth annular section.

* * * * *